United States Patent
Banks et al.

(10) Patent No.: US 8,647,688 B2
(45) Date of Patent: Feb. 11, 2014

(54) METHOD OF FERMENTING WORT

(75) Inventors: Douglas John Banks, Howick (NZ); Herman Hendrik Jan Bloemen, Leiden (NL); Onno Cornelis Snip, Rijswijk (NL); Hendrikus Mulder, Uitgeest (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 704 days.

(21) Appl. No.: 12/300,774

(22) PCT Filed: May 14, 2007

(86) PCT No.: PCT/NL2007/050206
§ 371 (c)(1), (2), (4) Date: Apr. 16, 2009

(87) PCT Pub. No.: WO2007/136251
PCT Pub. Date: Nov. 29, 2007

(65) Prior Publication Data
US 2009/0311373 A1 Dec. 17, 2009

(30) Foreign Application Priority Data
May 19, 2006 (EP) .................................. 06114275

(51) Int. Cl.
*C12C 11/00* (2006.01)
*C12M 1/00* (2006.01)

(52) U.S. Cl.
USPC ......................................... 426/16; 435/289.1

(58) Field of Classification Search
USPC .......................................... 426/11, 13, 15, 16
See application file for complete search history.

(56) References Cited

U.S. PATENT DOCUMENTS

| | | | | |
|---|---|---|---|---|
| 3,234,026 | A | * | 2/1966 | Coutts .............................. 426/16 |
| 4,915,959 | A | | 4/1990 | Pajunen et al. |
| 6,077,549 | A | * | 6/2000 | Bodmer et al. ................. 426/16 |
| 2009/0269438 | A1 | | 10/2009 | Mulder et al. |

FOREIGN PATENT DOCUMENTS

| | | | |
|---|---|---|---|
| CA | 545867 A | | 9/1957 |
| DE | 35 14 958 A1 | | 10/1986 |
| DE | 44 30 905 C1 | | 5/1995 |
| DE | 100 03 155 A1 | | 8/2001 |
| EP | 0 022 613 A | | 1/1981 |
| EP | 0022613 A2 | * | 1/1981 |
| EP | 0 046 066 A | | 2/1982 |
| EP | 0 460 66 B1 | | 3/1984 |
| GB | 872391 A | * | 12/1961 |
| GB | 0 926 906 | | 5/1963 |
| GB | 1163825 A | * | 9/1969 |
| GB | 1 300 116 A | | 12/1972 |
| GB | 1300116 A | * | 12/1972 |
| GB | 2 197 341 A | | 5/1988 |
| JP | 2005-151818 | | 6/2005 |
| SU | 1283250 A | * | 1/1987 |
| WO | WO 9849264 A1 | * | 11/1998 |
| WO | WO 01/68796 A2 | | 9/2001 |
| WO | WO-2007/136253 A1 | | 11/2007 |

OTHER PUBLICATIONS

International Search Report for PCT/NL2007/050206, dated Sep. 24, 2007, 3 pages.
Machine Translation of JP 2005-151818 (15 pages).
Pollock, "Malt and Fermentation" International Food Information Service (IFIS), 1988, vol. 1, No. 1, p. 31. XP002403285.

* cited by examiner

*Primary Examiner* — Humera Sheikh
*Assistant Examiner* — Subbalakshmi Prakash
(74) *Attorney, Agent, or Firm* — Gilberto M. Villacorta; Sunit Talapatra; Foley & Lardner LLP

(57) ABSTRACT

The present invention relates to a continuous method of fermenting wort, said method comprising: -fermenting wort with a biologically active yeast to produce an alcohol containing fermented liquid; -introducing the fermented liquid containing at least 10 g/l of biologically active yeast into a maturation vessel; -separately removing yeast containing sediment and supernatant liquid from the vessel; and -optionally recirculating at least a part of the yeast containing sediment to the wort fermentation; wherein the residence time of the fermented liquid in the maturation vessel exceeds 6 hours. The present method offers the advantage that it combines maturation and yeast separation into one processing step, whereas conventional continuous processes require at least two separate processing steps, one for yeast separation and one for maturation. Secondly, the present method is very robust as the relatively high residence time that is needed for maturation ensures that effective sedimentation is achieved under virtually all conditions.

25 Claims, 1 Drawing Sheet

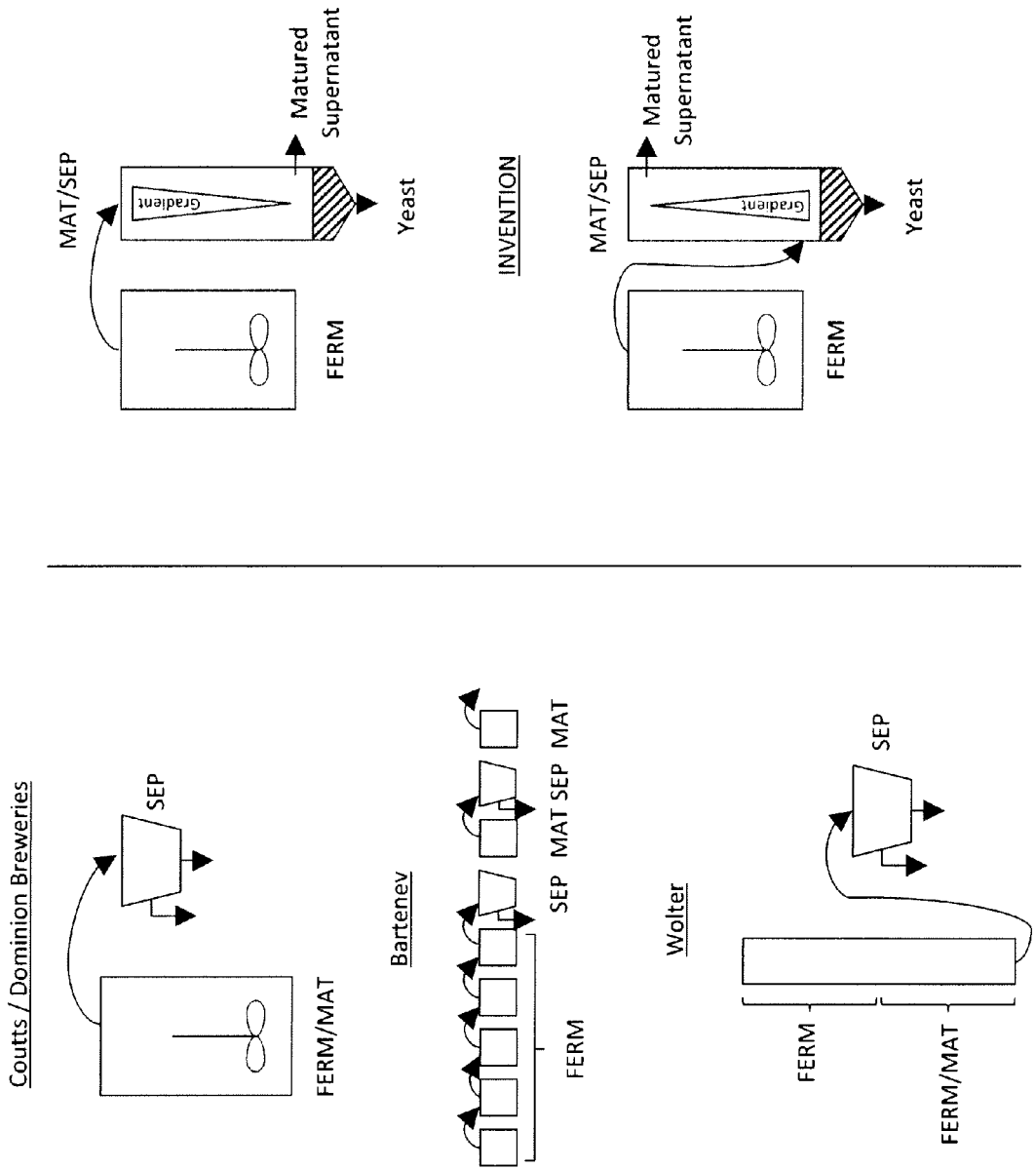

METHOD OF FERMENTING WORT

TECHNICAL FIELD OF THE INVENTION

The present invention relates to a continuous method of fermenting wort, said method including fermentation of the wort with a biologically active yeast to yield an alcohol-containing fermented liquid, followed by yeast removal and maturation. The present method is particularly suited for the production of alcoholic beer. The present invention also provides an apparatus for use in the aforementioned method.

BACKGROUND OF THE INVENTION

To make beer, brewers use water and barley to create a sweetened liquid (called the wort), which they flavour with hops, then ferment with yeast. The basic process may be simple but the execution is highly sophisticated. The most important stages are malting, brewing and fermentation, followed by maturation, filtering and bottling. During fermentation, extracted carbohydrates in the wort are converted by yeast into alcohol and carbon dioxide, while new yeast cells are formed. The maturation step is an important aspect of the beer brewing process; maturation is required to create beer with mature and consistent flavour. During primary fermentation, one of the first phases is yeast growth. During this phase, as the yeast cells multiply, all biochemical activities including amino acid synthesis are "switched on". In the biochemical pathway of valine synthesis (an amino acid), alpha-acetolactate is formed in excess quantities and secreted by the yeast cells into the wort. In the wort outside the yeast cells the alpha-acetolactate is converted chemically by decarboxylation to a diketone, diacetyl; the conversion of alpha acetolactate to diacetyl is a chemical reaction controlled by the pH, temperature and the redox state of the beer.

Many diketones, including diacetyl, are strong flavour components and have a very low taste threshold; diacetyl has a flavour threshold of about 0.10-0.15 mg/l and has a strong buttery or butterscotch flavour, which is a characteristic of "green" or "young" or immature beer. In order to balance the flavour of beer after primary fermentation, secondary fermentation or other forms of maturation are utilised to reduce the concentration of diacetyl below that of the human taste threshold. The classic method of maturation involves "secondary fermentation". During this phase, the yeast cells consume diacetyl and enzymatically reduce diacetyl to yield acetoin. Acetoin has a significantly higher taste threshold, i.e. about 8-20 mg/l, than diacetyl.

The reaction rate of diacetyl to acetoin is much faster than the reaction rate of acetolactate to diacetyl under standard brewing temperatures and conditions. In order to prevent the formation of diacetyl in the maturation stage, it is necessary to limit the amount of diacetyl precursors (including alpha acetolactate) present as the beer leaves the maturation stage. If this is not accomplished, "potential" diacetyl remains which, after the maturation stage, can alter the flavour of the beer.

Secondary fermentation is a lengthy process, which can typically last several days or more and is conducted as a "batch" process. Commercial brewers have sought methods which "mature" beer faster, cheaper and more efficiently. Among the prior art methods utilized is a diacetyl "rest". In this process, the green beer is held at a temperature of 12-18° C. for a few days to about a week following primary fermentation. This "rest" allows all or substantially all of the alpha-acetolactate to be secreted by the yeast and reduced to diacetyl, which is subsequently enzymatically reduced by yeast to acetoin during maturation.

Utilization of a continuous maturation process could potentially increase the efficiency of and reduce the brewing time and cost for the production of beer.

In the production of yeast fermented beverages, such as beer, continuous fermentation, including continuous maturation, can offer a number of significant advantages, including:

higher productivity and lower investment: equipment can be operated for prolonged periods of time under full load, meaning that for equal production volume smaller vessels are needed than in a batch process;

constant and better quality: process is easier to control due to possibility of adapting process parameters to local and instantaneous requirements and because steady-state-conditions are much more stable;

high hygienic standard: continuous process is operated in a closed system.

less energy: energy consumption is evenly spread, without major use peaks; and less labour: operation of continuous process requires less attention less standstill and cleaning: continuous process can be operated at much longer run lengths than batch processes.

These potential advantages of continuous fermentation have been recognised by the brewing industry a long time ago. Accordingly, many attempts have been made to design continuous fermentation processes that do indeed deliver those potential benefits.

U.S. Pat. No. 3,234,026 describes a method for the continuous fermentation of brewer's wort to produce a potable beer, said method comprising: maintaining in separate vessels, separate yeast propagation and product formation process stages; maintaining aerobic conditions in the yeast propagating stage; maintaining substantially anaerobic conditions in the product formation stage; continuously introducing brewer's wort to the yeast propagation stage and maintaining yeast propagation therein; continuously passing effluent from the yeast propagation stage to the product formation stage; separating yeast from effluent of the product formation stage and maintaining the yeast concentration in the product formation stage at an artificially high level by re-introducing a portion of the separated yeast to the product formation stage. The US patent teaches to separate the yeast from the fermented liquid in a separating vessel in which the yeast quickly flocculates and settles out to the bottom of said vessel. The US patent further teaches to pass the clarified fermented liquid by pipeline to a heat exchanger to reduce the temperature and subsequently to a holding vessel where the liquid may be held for a predetermined time and withdrawn for storage and finishing.

GB-B 1 300 116 describes a continuous fermentation process which comprises feeding unfermented wort to the lower part of a first fermentation vessel, passing the wort upwardly in the vessel through a zone containing an essentially stationary homogeneous mass of yeast, removing partially fermented wort containing a small proportion of yeast from the upper part of the first vessel, passing the partially fermented wort and yeast to an intermediate point in a second vessel, where further fermentation may take place and removing the fermented wort from the upper part of the second vessel, and continuously or intermittently removing settled yeast from the bottom of the second vessel. The British patent describes an embodiment in which fermented wort containing suspended yeast is removed from the second vessel and passed into a settling tank where the suspended yeast settles and a clarified fermented wort is removed from the upper part of the settling vessel.

EP-A 0 022 613 describes a method of continuous fermentation in which a carbohydrate solution is fed continuously in a fermentation zone containing substantially homogeneously distributed yeast and carbohydrate solution, a proportion of the fermenting liquid continuously passing to a pressurised settling tank, yeast depleted liquid being withdrawn from the upper part of the settling tank, yeast enriched liquid being withdrawn from the lower part of said tank and returned to the fermentation zone.

DE-A 100 03 155 describes a discontinuous method for accelerated production of beer in which green beer is produced with the help of immobilised yeast. The green beer so produced contains some non-immobilised yeast which is removed through sedimentation in a sequence of two decanters that are being cooled to 0-10° C.

SUMMARY OF THE INVENTION

The inventors have developed an improved continuous method for fermenting wort wherein, following fermentation of the wort with biologically active yeast, yeast separation and maturation are achieved concurrently within the same vessel. This improvement is realised by continuously introducing yeast-containing fermented wort into a vessel from which a yeast containing sediment and a supernatant liquid are removed separately, after a residence time in said vessel of more than 6 hours.

The present method offers a number of advantages. First of all, the present method combines maturation and yeast separation into one processing step, whereas conventional continuous processes require at least two separate processing steps, one for yeast separation and one for maturation. As such, the total number of vessels for the present method of combined separation and maturation, compared to the conventional continuous processes, is reduced by one vessel. Secondly, the present method is very robust as the relatively high residence time that is needed for maturation ensures that effective sedimentation is achieved under virtually all conditions.

DETAILED DESCRIPTION OF THE INVENTION

Accordingly, the present invention relates to a continuous method of fermenting wort, said method comprising:
fermenting wort with a biologically active yeast to produce an alcohol containing fermented liquid;
introducing the fermented liquid containing at least 10 g/l of biologically active yeast into a maturation vessel;
separately removing yeast containing sediment and supernatant liquid from the vessel; and
optionally recirculating at least a part of the yeast containing sediment to the wort fermentation;
wherein the residence time of the fermented liquid in the maturation vessel exceeds 6 hours, preferably exceeds 12 hours, most preferably exceeds 24 hours.

Whenever reference is made to "yeast content" or "yeast concentration", unless specifically indicated otherwise, what is meant is the concentration of wet yeast. The amount of wet yeast contained in a suspension equals the amount of yeast cake with a water content of 73% that may be isolated from the suspension by means of centrifugation. The aforementioned water content includes the water contained in the yeast cells.

It is noted that the present invention also encompasses a method in which concurrent maturation and yeast sedimentation are achieved in a sequence of two or more vessels. Thus, wherever reference is made to "a maturation vessel" this should be understood to also encompass a sequence of two or more maturation vessels in which sedimentation and maturation occur concurrently.

The terminology "recirculating yeast containing sediment to the wort fermentation" encompasses recirculation of the sediment directly to the wort fermentation as well as recirculation to the yeast propagation stage that advantageously proceeds said wort fermentation.

The present process is particularly suitable for producing yeast-fermented malt beverages such as beer, ale, malt liquor, porter and shandy. Preferably, the present process is employed to produce beer, especially alcoholic beer.

The benefits of the present invention are particularly pronounced in case the fermented liquid contains high levels of yeast. Thus, according to a preferred embodiment, the fermented liquid contains at least 15 g/l more preferably at least 20 g/l, even more preferably at least 40 g/l and most preferably at least 60 g/l of yeast. Usually the yeast concentration in the fermentation vessels does not exceed 300 g/l, preferably it does not exceed 280 g/l, most preferably it does not exceed 250 g/l.

In the present method, the fermented liquid is suitably introduced near the top the maturation vessel and both the yeast-containing sediment and the supernatant liquid are removed from the bottom part of the vessel. Alternatively, the fermented liquid is introduced near the bottom of the maturation vessel, the yeast-containing sediment is removed from the bottom part of the vessel and the supernatant liquid is removed from the upper part of the vessel. In order to achieve both effective separation and effective maturation, the downward or upward flow should be non-turbulent. According to a particularly preferred embodiment, the fermented liquid passes through the maturation vessel in a vertically downward or upward laminar flow. Most preferably, the liquid passes through the maturation vessel in a vertically downward flow.

The separation efficacy of the present method is apparent from the fact that typically the concentration of biologically active yeast in the supernatant liquid upon removal is at least 5 times lower than the concentration of biologically active yeast in the fermented liquid prior to introduction into the maturation vessel. Preferably, the reduction in yeast concentration is at least a factor 7, more preferably at least a factor 10.

Upon removal from the maturation vessel, the yeast sediment usually contains at least 100 g/l of yeast. Preferably, the yeast content of the removed sediment is at least 200 g/l, more preferably at least 250 g/l and even more preferably at least 300 g/l. According to a particularly preferred embodiment, the yeast content of the removed sediment is at least 400 g/l, most preferably at least 500 g/l. Especially in case the fermentation is conducted at a high yeast concentration it is advantageous to remove a sediment with a high yeast content and to recirculate it to the propagation/fermentation.

In order to achieve effective separation and maturation, the fermented liquid should be introduced in the maturation vessel at a level that is well above the level at which the yeast-containing sediment is formed. This preferred embodiment may be formulated more mathematically as follows:
if level (x) represents the level of the liquid contained in the maturation vessel;
if level (y) represents the level of the yeast sediment in the maturation vessel;

if level (a) represents the level at which the fermented wort is introduced into the maturation vessel, with the proviso that level (a) is assumed to coincide with level (x) if the fermented wort is introduced above level (x);

if level (b) represents the level at which the supernatant is removed from the maturation vessel;

then levels (x), (a) and (b) are higher than level (y); and the vertical distance between levels (a) and (b) represents at least 50%, preferably at least 60% and more preferably at least 70% of the vertical distance between levels (x) and (y).

The efficacy of maturation is suitably demonstrated by the decrease in alpha-acetolactate and diacetyl levels achieved during maturation. In the present method, the total concentration of alpha-acetolactate and diacetyl in the supernatant liquid immediately after removal is reduced by at least 30%, preferably at least 50%, most preferably at least 70% relative to the total concentration of alpha-acetolactate and diacetyl in the fermented liquid.

The temperature of the liquid within the maturation vessel is advantageously maintained at a temperature within the range of 10 to 30° C., more preferably within the range of 10 to 20° C. Within these temperature ranges maturation can be achieved very effectively. In the present method fermentation is preferably carried out with the help of suspended yeast, i.e. not with yeast that is immobilized on a carrier.

The fermented liquid typically has an original gravity within the range of 10 to 35° P.

In accordance with a preferred embodiment, wort fermentation includes the steps of:

a. introducing wort into a series of one or more propagation vessels in which it is combined with a recirculated stream of yeast-containing residue and in which the yeast is allowed to propagate under aerobic conditions whilst being kept suspended; and b. transferring the yeast-containing wort from the propagation vessel into a series of one or more fermentation vessels in which the yeast is kept suspended under anaerobic conditions and is allowed to metabolise carbohydrates present in the wort;

The yeast concentration in the series of propagation vessels exceeds 10 g/l, more preferably it is within the range of 20-300 g/l.

Following the combination of wort and yeast-containing residue, the yeast concentration may be reduced, e.g. by adding more wort, when the wort leaves the propagation vessel or during fermentation in the one or more fermentation vessels. Preferably, the yeast concentration is not reduced after propagation and also not before yeast separation.

By recirculating a part of the yeast sediment from the maturation vessel to the one or more propagation vessels, fermentation of the wort can be conducted at a high yeast concentration. The utilisation of high yeast concentrations offers the advantage that fermentation times and/or fermenter volume can be reduced substantially. Furthermore, continuous fermentations conducted at high yeast concentrations are less vulnerable to microbial infections. The present process can be operated at high efficiency by recirculating a large fraction of the yeast-containing residue that is obtained from the maturation vessel. According to a preferred embodiment, between 10 and 100%, most preferably between 50 and 100% of the yeast sediment that is removed from the maturation vessel is recirculated to the fermentation.

Typically, at least 40% of the yeast present in the fermented liquid is recirculated to the propagation vessel. More preferably at least 60% of the yeast present in the fermented liquid is recirculated, most preferably at least 75% of the yeast present in the fermented liquid is recirculated. Usually not more than 98% of the yeast present in the fermented liquid is recirculated.

In the present process, advantageously at least 20%, especially at least 40% of the yeast present in the fermented liquid is removed before it is subjected to clarification, or if it is not, before it is packaged. Preferably, at least 60%, more preferably at least 80%, even more preferably at least 90% and most preferably at least 95% of the yeast present in the fermented liquid is removed.

In order to achieve a high rate of yeast propagation it is important that the yeast is kept suspended. This may suitably be achieved by means of stirring, recirculation, carbon dioxide evolution and/or aeration. The productivity of the yeast in the series of one or more fermentation vessels is also optimal if the yeast is kept suspended. Preferably, the yeast is kept suspended in the series of one or more fermentation vessels by means of stirring, recirculation and/or carbon dioxide evolution. According to a particularly preferred embodiment, both the propagation and fermentation vessels employed in the present method are continuously stirred so as to keep the yeast suspended and to ensure the homogeneity of the suspensions within these vessels.

Since yeast propagation requires aerobic conditions, it is important that sufficient oxygen is made available to the yeast cells in the propagation vessel(s) to achieve sufficient propagation rates. Stirring and/or recirculation may suitably be employed to continuously introduce air into the yeast-containing wort. In an advantageous embodiment of the invention, pressurised oxygen containing gas (e.g. air) is continuously introduced into the yeast-containing wort or into the headspace above the yeast-containing wort. Alternatively, said pressurised oxygen containing gas is injected into the wort stream or the recirculated stream of yeast containing residue prior to entry into the propagation vessel. In another alternative option, the oxygen containing gas is introduced directly into the yeast-containing wort, e.g. by means of injecting the gas through a plurality of injectors near the bottom of the propagation vessel(s). According to a particularly preferred embodiment, oxygen is supplied by introducing it into the wort stream prior to entry into the propagation vessel. This embodiment offers the advantage that the oxygen concentration can be controlled quite accurately. Oxygen is typically introduced in the yeast-containing wort in an amount of at least 8 ppm, preferably in an amount of 10-40 ppm, calculated on the main wort stream.

Due to the favourable propagation conditions employed in the propagation vessel(s), substantial amounts of yeast are produced in the present method. Typically, at least 5 gram, preferably more than 10 gram of wet yeast is produced per litre of fermented wort. Preferably, at least 0.05 g, more preferably at least 0.08 g and most preferably at least 0.1 g of wet yeast is produced per gram of fermented extract (15° P. equals 150 g extract per kg). In order to maintain a high yeast concentration in the propagation vessel(s) the recirculated yeast-containing residue must have a high yeast content.

The temperature of the liquid within the series of one or more propagation vessels is suitably maintained within the range of 5-40° C., preferably within the range of 6-25° C., most preferably within the range of 8-18° C. The propagation vessel(s) may be operated under super-atmospheric pressure, especially if pressurised air or oxygen is introduced into the vessel. Preferably, the propagation vessel is operated at atmospheric pressure or at an increased pressure of up to 1.5 atmosphere (absolute).

The temperature of the fermenting wort within the fermentation vessel(s) is suitably maintained within the range of 5-25° C., preferably within the range of 6-25° C., more preferably in the range of 8-18° C. According to a particularly preferred embodiment, the present method employs at least two fermentation vessels. The use of two or more fermentation vessels offers the advantage that higher substrate conversion rates can be achieved in the vessels preceding the last fermentation vessel. Typically, a sequence of not more than 4 fermentation vessels is employed. Most preferably, the present method employs a sequence of 2 or 3 fermentation vessels.

In a particularly advantageous embodiment of the present method the gravity of the wort that is introduced in the series of one or more propagation vessels is in the range of 10-35° P., more preferably in the range of 12-30° P. and most preferably in the range of 12-25° P. By using a high gravity wort, i.e. a wort containing high levels of fermentable extract, maximum advantage may be gained from the high yeast concentrations employed in the present process. The combination of high gravity and high yeast concentration enables the production of fermented wort at an extremely high throughput relative to the size of the fermenters. Following fermentation, the fermented high gravity wort may be diluted, e.g. to produce a beer with an alcohol content of about 5 vol. %.

The present method offers the advantage that fermentation times can be reduced significantly compared to batch processes and continuous processes that utilise low yeast concentrations. Preferably, the combined residence time in the propagation and fermentation vessels does not exceed 80 hours, more preferably it does not exceed 40 hours, most preferably it does not exceed 30 hours. According to a particularly preferred embodiment, the combined residence time in the propagation and fermentation vessels does not exceed 20 hours.

The residence time in the series of one or more propagation vessels typically does not exceed 10 hours, preferably it does not exceed 5 hours. Usually, the residence time in the series of one or more propagation vessels exceeds 0.5 hours. The residence time in a vessel can be calculated by dividing the operational volume of the vessel by the wort flow rate to the process. The operational volume of the vessel equals the total volume of suspension that is contained in the vessel. In case a series of two or more are employed, the combined residence time in such series of vessels can be calculated by adding up the residence times of the individual vessels.

In the present method propagation and fermentation are preferably executed in a closed system. The use of a closed system offers the advantage that it reduces the risk of infection and/or contamination. In addition, the use of a closed system makes it easy to collect the carbon dioxide that is generated by the yeast. The carbon dioxide collected from the propagation and/or fermentation vessels can be used, for instance, to carbonate the yeast fermented beverage. The latter application usually requires the carbon dioxide to be recuperated before it is added to the beverage.

Following removal of the yeast-containing residue from the fermented liquid, the removed liquid supernatant may be subjected to further processing. In the case of production of beer, the further processing preferably includes cold storage, clarification, stabilisation, carbonation and filling. Preferably, also cold storage, carbonation and filling is done in a continuous fashion.

Another aspect of the invention relates to an apparatus for carrying out the method as described above, said method comprising:

a fermentation vessel holding an alcohol containing fermented liquid containing biologically active yeast, said biologically active yeast being suspended in the fermented liquid;

a maturation vessel holding a yeast-containing sediment and a supernatant liquid, said maturation vessel having its inlet connected to the fermentation vessel;

the maturation vessel having in its top section or in its lower section the inlet for receiving fermented liquid containing biologically active yeast, the maturation vessel having a separator member for continuous separation of yeast containing sediment and supernatant liquid, the separator member supplying the supernatant liquid to an output for matured liquid and supplying yeast containing sediment to a yeast output, wherein the yeast output is situated in the lower section of the maturation vessel and wherein the output for the supernatant liquid is situated in the lower section of the maturation vessel in case the inlet for receiving fermented liquid is in the top section of the maturation vessel or in the top section of the maturation vessel in case the inlet for receiving fermented liquid is in the lower section of the maturation vessel. Preferably, the inlet of receiving fermented liquid is in the top section and the output for the supernatant liquid is situated in the lower section.

The biologically active yeast contained in the fermented liquid is not-immobilised on a carrier. The fermentation vessel is advantageously provided with a stirring device that can be employed to keep the yeast in suspension.

The yeast-containing fermented liquid may suitable be introduced into the maturation vessel as such. Thus, it is not necessary to remove any yeast prior to introduction of the fermented liquid into the maturation vessel. Accordingly, it is preferred that there is no filter member interposed between the fermentation vessel and the maturation vessel As explained herein before the supernatant liquid and the yeast-containing sediment are advantageously removed at the lower end of the maturation vessel. Accordingly, the output for the supernatant liquid and the yeast output are preferably situated in a lower section of the maturation vessel. According to a particularly preferred embodiment of the invention, the maturation vessel comprises a conical lower section. The conical lower section typically has a cone angle of less than 150°, especially of less than 130°. Preferably, said cone angle is less than 100°, more preferably less than 90° and most preferably less than 70°.

In a further advantageous embodiment, the separator member comprises an output duct for the supernatant liquid that contains one or more inlet openings, said inlet openings being positioned above the yeast-containing sediment at the bottom of the maturation vessel.

In order to allow at least part of the yeast-containing sediment to be recirculated to the wort fermentation, the yeast output is advantageously connected to the fermentation vessel or to a propagation vessel that is positioned upstream of said fermentation vessel.

The invention is further illustrated by means of the following example.

EXAMPLE

This example describes the continuous fermentation of wort in a process that utilises one propagation vessel, two fermentation vessels, and one sedimentation/maturation vessel.

Oxygenated wort with an original gravity of 15° P. is continuously supplied to the propagation vessel at a flow rate of 0.8 hl/hr. This wort is pitched by supplying a recirculation stream at a flow rate of 0.5 hl/hr to this propagation vessel, said recirculation stream containing sedimented yeast from the maturation vessel. The propagation vessel contains a liquid volume of 0.5 hl, said liquid having a temperature of approximately 12° C. The yeast concentration in the propagation vessel is 81 g wet yeast/l.

The liquid volume in the propagation vessel is kept constant by transferring the fermentation broth to a first fermentation vessel, which contains a liquid volume of 7.7 hl. The temperature in the first fermentation vessel is kept constant at 15° C. Due to yeast growth the yeast concentration in this vessel has increased to 86 g wet yeast/l.

The liquid volume in the first fermentation vessel is kept constant by transferring the fermentation broth to the second fermentation vessel, which contains a liquid volume of 7.7 hl. The temperature in the second fermentation vessel is kept constant at 15° C. Due to yeast growth the yeast concentration in this vessel has increased to 90 g wet yeast/l. The apparent gravity in the second fermentation vessel is 2-3° P. The total diacetyl content (acetolactate plus diacetyl) of the liquid in the second fermentation vessel was 0.83 mg/l and the total pentanedione content (acetobutyrate plus pentanedione) was 0.91 mg/l.

The liquid volume in the second fermentation vessel is kept constant by transferring the fermentation broth to the top of the maturation/sedimentation vessel. This cylindroconical vessel has a liquid volume of approximately 90 hl, a cone angle of 600 and a diameter of 2 m. A part of the sedimented yeast (0.5 hl/l) is recirculated to the propagation vessel. The fermentation broth with the reduced yeast content is continuously sent to a beer storage vessel for further processing. The total diacetyl content (acetolactate plus diacetyl) in the supernatant liquid of the separation/maturation vessel was 0.21 mg/l and the total pentanedione content (acetobutyrate plus pentanedione) was 0.4 mg/l.

The invention claimed is:

1. A continuous method of fermenting wort, comprising:
   (a) fermenting wort with a biologically active yeast to produce an alcohol containing fermented liquid;
   (b) introducing the fermented liquid to a maturation vessel in a vertically downward or upward laminar flow through the maturation vessel, wherein the fermented liquid comprises biologically active yeast in an amount of at least 10 grams of wet yeast per liter, the amount of wet yeast being equal to the amount of a yeast cake with a water content of 73% isolated by means of centrifugation;
   (c) removing a yeast-containing sediment and a supernatant liquid from the maturation vessel; and
   (d) optionally recirculating at least a part of the yeast containing sediment to the fermented liquid;
   wherein the fermented liquid has a residence time in the maturation vessel exceeding 6 hours, and wherein the introduction of fermented liquid (b) and removal of yeast-containing sediment and supernatant liquid of (c) occur concurrently and continuously from the maturation vessel.

2. The method according to claim 1, wherein the residence time of the fermented liquid in the maturation vessel exceeds 12 hours.

3. The method according to claim 2, wherein the residence time of the fermented liquid in the maturation vessel exceeds 24 hours.

4. The method according to claim 1, wherein the fermented liquid passes through the maturation vessel in a vertically downwards laminar flow.

5. The method according to claim 1, wherein the concentration of biologically active yeast in the supernatant liquid is at least 5 times lower than the concentration of biologically active yeast in the fermented liquid prior to introduction into the maturation vessel.

6. The method according to claim 1, wherein the yeast sediment upon removal contains at least 100 g/l yeast.

7. The method according to claim 6, wherein the yeast sediment upon removal contains at least 200 g/l yeast.

8. The method according to claim 7, wherein the yeast sediment upon removal contains at least 250 g/l yeast.

9. The method according to claim 1, wherein the vertical distance between levels (a) and (b) represents at least 50% of the vertical distance between levels (x) and (y),
   wherein level (x) represents the level of the liquid contained in the maturation vessel;
   wherein level (y) represents the level of the yeast sediment in the maturation vessel;
   wherein level (a) represents the level at which the fermented wort is introduced into the maturation vessel, with the proviso that level (a) is assumed to coincide with level (x) if the fermented wort is introduced above level (x);
   wherein level (b) represents the level at which the supernatant is removed from the maturation vessel; and
   wherein levels (x), (a) and (b) being higher than level (y).

10. The method according to claim 1, wherein the fermented liquid prior to its introduction into the maturation vessel contains alpha-acetolactate and diacetyl and wherein total concentration of alpha-acetolactate and diacetyl in the supernatant liquid immediately after removal from the maturation vessel is reduced by at least 30% relative to the total concentration of alpha-acetolactate and diacetyl in the fermented liquid prior to introduction into the maturation vessel.

11. The method according to claim 10, wherein the total concentration of alpha-acetolactate and diacetyl in the supernatant liquid immediately after removal from the maturation vessel is reduced by at least 50% relative to the total concentration of alpha-acetolactate and diacetyl in the fermented liquid prior to introduction into the maturation vessel.

12. The method according to claim 11, wherein the total concentration of alpha-acetolactate and diacetyl in the supernatant liquid immediately after removal from the maturation vessel is reduced by at least 70% relative to the total concentration of alpha-acetolactate and diacetyl in the fermented liquid prior to introduction into the maturation vessel.

13. The method according to claim 1, wherein between 10 and 100% of the yeast sediment that is removed from the maturation vessel is recirculated to the fermentation step (a).

14. The method according to claim 13, wherein between 50 and 100% of the yeast sediment that is removed from the maturation vessel is recirculated to the fermentation step (a).

15. The method according to claim 1, wherein the wort is fermented with yeast that is not immobilized on a carrier.

16. The method according to claim 1, wherein fermented liquid contains at least 10 g/l of yeast.

17. The method according to claim 16, wherein fermented liquid contains at least 20 g/l of yeast.

18. The method according to claim 17, wherein fermented liquid contains at least 40 g/l of yeast.

19. The method according to claim 1, wherein the liquid within the maturation vessel has a temperature within the range of 10 to 30° C.

20. The method according to claim 19, wherein the liquid within the maturation vessel has a temperature within the range of 10 to 20° C.

21. The method according to claim 1, wherein the fermented liquid has gravity within the range of 10 to 35° P. prior to introduction into the maturation vessel.

22. An apparatus for continuous fermentation of wort, comprising:
(a) a fermentation vessel for holding an alcohol-containing fermented liquid comprising biologically active yeast; and
(b) a maturation vessel, having a top section and a lower section, for holding a yeast-containing sediment and a supernatant liquid, said maturation vessel comprising:
   (i) an inlet connected to the fermentation vessel at the top section,
   (ii) a separator member for continuous separation of yeast containing sediment and supernatant liquid,
   (iii) a supernatant output for matured liquid
   (iv) a yeast output for yeast containing sediment,
wherein both the yeast output and the supernatant output are situated in the lower section of the maturation vessel.

23. The apparatus according to claim 22, wherein the maturation vessel comprises a conical lower section, the separator member comprises an output duct for the supernatant liquid that contains one or more inlet openings, said inlet openings being positioned above the yeast-containing sediment.

24. The apparatus according to claim 22, wherein the yeast output is connected to the fermentation vessel.

25. The apparatus according to claim 22 comprising a propagation vessel, wherein the propagation vessel is positioned upstream of the fermentation vessel.

* * * * *

UNITED STATES PATENT AND TRADEMARK OFFICE
CERTIFICATE OF CORRECTION

PATENT NO. : 8,647,688 B2
APPLICATION NO. : 12/300774
DATED : February 11, 2014
INVENTOR(S) : Banks et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 979 days.

Signed and Sealed this
Eleventh Day of August, 2015

Michelle K. Lee
*Director of the United States Patent and Trademark Office*